(12) United States Patent
Jung et al.

(10) Patent No.: US 12,508,230 B2
(45) Date of Patent: Dec. 30, 2025

(54) ADDITIVE COMPOSITION FOR FORMULATION CAPABLE OF STABILIZING PORE OF SOLID PARTICLES AND METHOD FOR PRODUCTION THEREOF

(71) Applicant: NaturePureKorea Co., Ltd., Jeollanam-do (KR)

(72) Inventors: Woog Jung, Gwangyang (KR); Min Sik Kim, Suncheon (KR); Soo Hee Chung, Daegu (KR)

(73) Assignee: NPK Inc.

( * ) Notice: Subject to any disclaimer, the term of this patent is extended or adjusted under 35 U.S.C. 154(b) by 988 days.

(21) Appl. No.: 17/298,723

(22) PCT Filed: Dec. 3, 2020

(86) PCT No.: PCT/KR2020/017547
§ 371 (c)(1),
(2) Date: Jun. 1, 2021

(87) PCT Pub. No.: WO2021/118162
PCT Pub. Date: Jun. 17, 2021

(65) Prior Publication Data
US 2021/0378966 A1    Dec. 9, 2021

(30) Foreign Application Priority Data
Dec. 10, 2019 (KR) .................. 10-2019-0163247

(51) Int. Cl.
*A61K 9/20*     (2006.01)
*A23L 33/105*   (2016.01)
*A23L 33/125*   (2016.01)
*A23P 10/28*    (2016.01)

(52) U.S. Cl.
CPC .......... *A61K 9/2068* (2013.01); *A23L 33/105* (2016.08); *A23L 33/125* (2016.08); *A23P 10/28* (2016.08); *A61K 9/205* (2013.01); *A61K 9/2054* (2013.01); *A23V 2002/00* (2013.01)

(58) Field of Classification Search
CPC .... A61K 36/725; A61K 9/205; A61K 9/2054; A61K 9/2068; A23L 33/105; A23L 33/125
See application file for complete search history.

(56) References Cited

FOREIGN PATENT DOCUMENTS

| | | | | | |
|---|---|---|---|---|---|
| CN | 104366485 | A | * | 2/2015 | ............ A23L 33/10 |
| KR | 10-2006-010408 | | * | 8/2007 | |
| KR | 10-2006-0010408 | A | * | 8/2007 | |
| KR | 10-2007-0079638 | A | | 8/2007 | |
| KR | 102060010408 | A | * | 8/2007 | |
| KR | 10-2013-0123532 | A | | 11/2013 | |
| KR | 10-2016-0112107 | A | | 9/2016 | |
| KR | 10-2018-0015437 | A | | 2/2018 | |
| KR | 10-2018-0061531 | A | * | 6/2018 | |
| KR | 2018-0061531 | | * | 6/2018 | |
| KR | 20180061531 | A | * | 6/2018 | |
| KR | 10-2019-0124364 | A | | 11/2019 | |

OTHER PUBLICATIONS

International Search Report of PCT/KR2020/017547 dated Mar. 18, 2021.

* cited by examiner

*Primary Examiner* — George W Kosturko
(74) *Attorney, Agent, or Firm* — Temmerman Law; Mathew J. Temmerman

(57) ABSTRACT

The present invention relates to an additive composition, and more particularly, to an additive composition capable of stabilizing pores of particles in a solid formulation. The present invention provides an additive composition including a naturally derived raw material, which enables formulation without using any synthetic additives. Further, the present invention provides an additive composition in which particles are uniformly distributed by reducing pores of particles in a formulation, as well as tablets, powders or the like including the same.

3 Claims, 10 Drawing Sheets

ADDITIVE COMPOSITION FOR FORMULATION CAPABLE OF STABILIZING PORE OF SOLID PARTICLES AND METHOD FOR PRODUCTION THEREOF

RELATED APPLICATIONS

This application is a 35 U.S.C. 371 National Stage Entry of International Application No. PCT/KR2020/017547, filed Dec. 3, 2020, and claims the benefit of Korean Patent Application 10-2019-0163247, filed Dec. 10, 2019, each of which is incorporated herein by reference in its entirety for all purposes as if fully set forth herein.

TECHNICAL FIELD

The present invention relates to an additive composition for formulation, capable of stabilizing pores of particles in a solid formulation, and more particularly, to an additive composition for formulation, which includes a naturally derived component capable of stabilizing pores of particles in a solid formulation.

BACKGROUND ART

Recently, as consumer's interest in well-being and natural foods has been increased, the use of natural additives instead of synthetic additives has been gradually increasing throughout the food industry, and the range thereof has also been diversely extended. In particular, in the health functional foods, safety and eco-friendly factors in a manufacturing process are considered important. Therefore, a variety of products containing natural ingredients is being developed and the scale of a market is also increasing.

In the health food industry, various excipients are used for manufacturing tablets and powder products. With regard to effects on physical properties of the product, these excipients influence on hardness due to a binding strength of tablets, degree of disintegration ("disintegration") relating to smooth disintegration of tablets, degree of abrasion ("abrasion") relating to continuous binding strength of tablets, fluidity due to movement of a mixture in formation of tablets, tablettability as a result of tablet formation or the like.

In general, most products in the health food industry are manufactured by a wet granulation process, in which a solution is added to a powder for granulation of particles. In the wet granulation process, when granules are over-dried in a process of product assembly, fine powder is generated in a great quantity while sizing the over-dried granules. Such fine powder has poor fluidity in a tablet machine, involves a weight deviation in tablets, and causes capping such that an upper portion of the tablet is peeled off in a hat form and/or laminating such that the tablet is peeled off in layers, during tablet compression ("tabletting"). Therefore, in order to assemble the fine powder, for example, HPMC as a general binder may be diversely used as a binder or a coating base material depending on an amount to be added.

With regard to tablet products widely used in the health food industry, despite great efforts to replace synthetic additives with natural additives, different problems arise in the manufacturing process, for example, sticking that causes scratches on a disk of the tablet machine (a plate contacting a mixture under tabletting) and a punch surface of the tablet machine because a raw material is adhered to the above disk and punch surface due to frictional heat generated during high-speed tabletting or the like. Therefore, synthetic additives for formulation are still inevitably used in most products.

Among them, stearic acid or magnesium stearate, which is mostly widely used as a lubricant, has excellent lubrication performance even at a content of about 0.5 to 1% of total weight and assists improvement of fluidity of the mixture. Further, when the mixture needs improved fluidity, anti-caking agents such as silicon dioxide are widely used. However, since all of these substances are classified as chemically synthetic products, a need for development of health food products that contain only naturally derived ingredients to overcome the above problems is being increased.

SUMMARY OF INVENTION

Problems to be Solved by Invention

In order to solve the afore-mentioned problems, it is an object of the present invention to provide a naturally derived additive composition that enables formulation without using synthetic additives.

Further, another object of the present invention is to provide a method for production of the naturally derived additive composition.

Means for Solving Problems

In order to achieve the above objects, according to an aspect of the present invention, there is provided an additive composition including a naturally derived raw material.

The additive composition of the present invention is not particularly limited, but preferably an additive composition for formulation.

The formulation refers to an appropriate form suitably manufactured for purpose or use thereof, and specific examples thereof may include solid formulations such as tablets, pellets, particulates, solid, granules, powder, etc., but it is not limited thereto. Among them, the tablet means a solid form easy to dose, which is formulated in a predetermined shape by pressing and compressing powder.

The above formulation may be applied to all of pharmaceutical formulations, cosmetic formulations, food or health food formulations.

The naturally derived raw material is not limited, however, a part of the raw material may include jujube-derived raw materials.

The jujube-derived raw material may be jujube extract or jujube itself, and may include dried and powdered products of jujube extract or jujube itself.

The jujube extract may be obtained using a polar or non-polar solvent.

Suitable polar solvents may include, for example, water, alcohol (methanol, ethanol, propanol, butanol, normal-propanol, iso-propanol, normal-butanol, 1-pentanol, 2-butoxyethanol or ethylene glycol, etc.), acetic acid, DMFO (dimethyl-formamide) and DMSO (dimethyl sulfoxide), and the like, preferably, anhydrous ethanol (99.5 v/v % or more).

Suitable non-polar solvents may include, for example, acetone, acetonitrile, ethyl acetate, methyl acetate, fluoroalkane, pentane, hexane, 2,2,4-trimethylpentane, decane, cyclohexane, cyclopentane, diisobutylene, 1-pentene, 1-chlorobutane, 1-chloropentane, o-xylene, diisopropyl ether, 2-chloropropane, toluene, 1-chloropropane, chlorobenzene, benzene, diethyl ether, diethyl sulfide, chloroform, dichloromethane, 1,2-dichloroethane, aniline, diethylamine, ether, carbon tetrachloride and THF, but it is not limited thereto.

When water is used as a solvent for extraction, the extraction may be any one selected from the group consisting of hot water extraction, cold immersion extraction, reflux cooling extraction, ultrasonic extraction and steam extraction, and preferably hot water extraction.

The jujube extract powder in the present invention is preferably included as a binder, but it is not limited thereto. Further, the jujube powder is preferably included as a lubricant, but it is not limited thereto.

The jujube extract powder may be included in an amount of 0.1 to 5% by weight ("wt. %"), and preferably 0.1 to 3 wt. % based on a total weight of a solid formulation. If the amount thereof is beyond the above range, hardness, disintegration and lubricity may be reduced during production of tablets.

The jujube powder means dried and powdered jujube, and may be included in an amount of 0.1 to 5 wt. %, and preferably 0.1 to 3 wt. % based on the total weight of a composition, that is, the solid formulation. If the amount thereof is beyond the above range, hardness, disintegration, lubricity and binding strength may be reduced during production of tablets.

When the jujube extract powder and jujube powder are mixed, the jujube extract powder:jujube powder may be included in a weight ratio of 1:1 to 6, and preferably, the jujube extract powder:jujube powder is included in a weight ratio of 1:1 to 3. If the weight ratio is beyond the above range, tackiness becomes too strong and may affect fluidity and tablettability of the powder during tabletting.

The additive composition may further include any excipient commonly used in the art. The excipient may include, for example, maltodextrin, lactose, glucose, white sugar, cellulose, crystalline cellulose, whey calcium, polyvinyl pyrrolidone, natural calcium preparations, etc., and may include any one or more thereof. Preferably, maltodextrin or crystalline cellulose is used, but it is not limited thereto.

The maltodextrin and crystalline cellulose may be included in an amount of 20 to 40 wt. %, and preferably 25 to 35 wt. % based on the total weight of the composition.

Further, the maltodextrin and crystalline cellulose may be included in a weight ratio of 1:1 to 3, and preferably 1:1 to 2.5.

The additive composition of the present invention may further include an active ingredient in addition to the above components, and an amount of the active ingredient may be the remaining weight of total weight of the composition excluding the raw material or excipient.

The present invention may provide a tablet (including powder formulation) composition including the above additive composition.

Further, the additive composition may reduce particle pores in tablets so as to uniformly distribute particles in the tablet, while improving hardness, disintegration degree, abrasion, fluidity, tablettability, etc.

A method for production of the additive composition may include:
(a) weighing and mixing raw materials;
(b) granulation;
(c) drying;
(d) sizing; and
(e) tableting.

The weighing and mixing of the raw material (a) is a step of weighing and mixing the raw materials according to basic Product Information (PI).

The granulation (b) is a step of mixing the raw materials in a predetermined mixing ratio, and then adding 80% (v/v) of alcohol thereto depending on a degree of granulation, thereby implementing granulation.

In the above granulation step, whether the granulation is performed or not may be determined according to physical properties of the raw materials during granulation. At this time, in the case of maltodextrine among the raw materials, particles are not agglomerated in 90% (v/v) of alcohol thus to fail granulation. On the other hand, in 70% (v/v) alcohol, particles are too agglomerated causing poor granulation. Therefore, 80% (v/v) of alcohol is preferably used.

The drying (c) is a step of drying the product in a dryer at 40 to 60° C., and preferably 50° C. for 14 to 16 hours after the granulation (b). If the temperature is lower than the above range, the drying is not properly implemented, as well as a drying time is increased. On the other hand, when the temperature is higher than the above range, tabletting may not be smoothly conducted in subsequent processes due to over-drying.

After the drying is completed, a water content is examined and the drying time may be adjusted by determining whether the water content is ±1% relative to a water content before the granulation.

The sizing (d) is a step of pulverizing the agglomerated raw material using a 20 mesh standard sieve after completing the drying (c).

The tabletting (e) is a step of conducting tablet compression using a tablet machine after sizing (d).

Advantageous Effects

The present invention may provide an additive composition including a naturally derived raw material, which enables formulation without using a synthetic additive. Further, the present invention may provide an additive composition in which particles are uniformly distributed by reducing pores of the particles.

MODE FOR CARRYING OUT INVENTION

Figure 1:
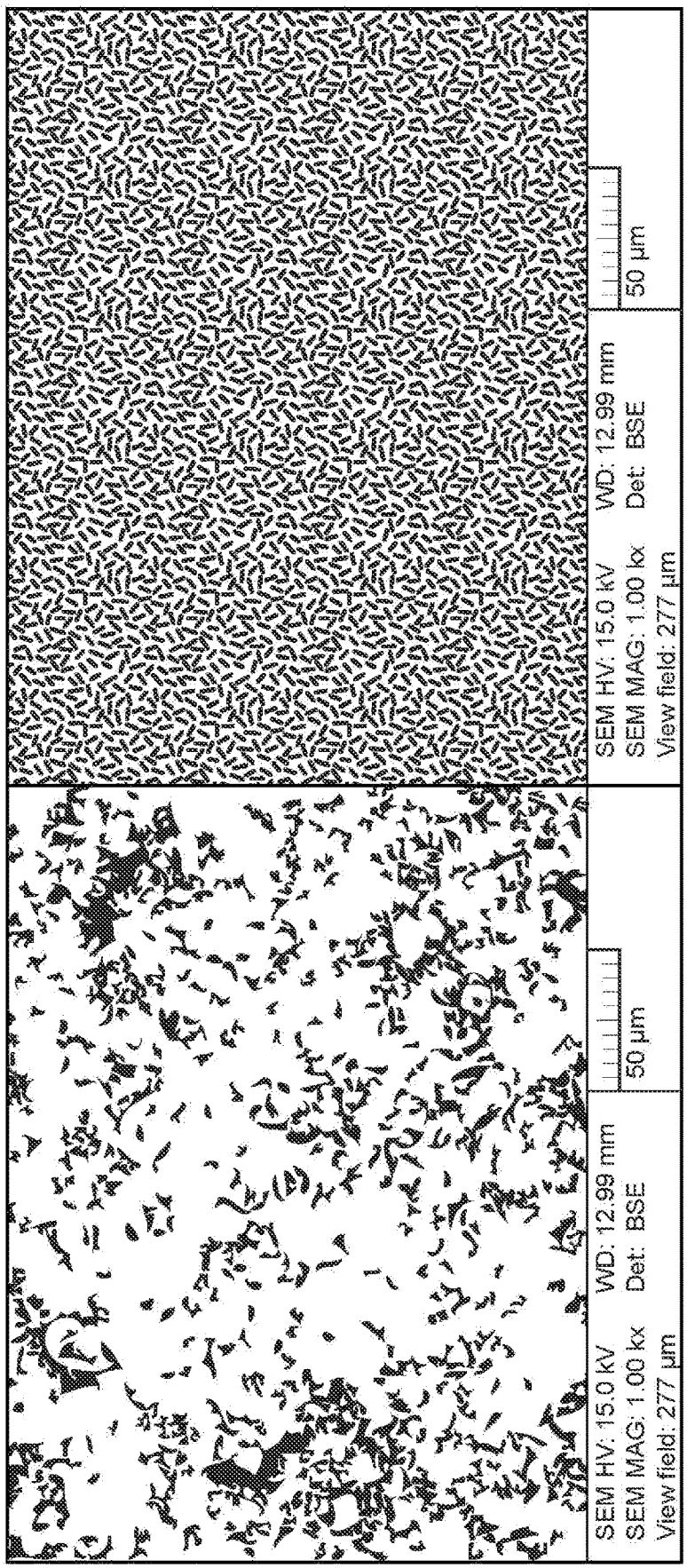
FIG. 1 illustrates FE-SEM results (positive control (left), interfacial interface activation (right)).

Hereinafter, the present invention will be described in detail by examples and experimental examples.

However, the following examples and experimental examples are merely illustrative of the present invention, and the contents of the present invention are not limited thereto.

Preparation in the following examples was performed according to basic Product Information (PI) for weighing and mixing of raw materials. After mixing the raw materials in a predetermined mixing ratio, granulation was conducted by adding 60 to 70 wt. % of 80% alcohol based on a total weight of the mixture depending on a degree of granulation. After the granulation, drying (HST 502M, Hanbaek ST, Korea) was conducted at 50° C. for 14 to 16 hours, and after drying, a water content was examined using a water content measuring instrument (MB45, OHAUS, Parsippany, NJ, USA). Then, a dying time was adjusted by determining whether the water content is ±1% relative to a water content before the granulation. When the granulation and drying processes were completed, the agglomerated raw material after drying is pulverized using a 20 mesh standard sieve. The powder was compressed into tablets using a single-stroke tablet machine (HSX0506261, Hyosung, Korea), and the numeral value of a pressure regulator in the tablet machine was observed and recorded in a range of 1 to 15.

Examples 1-1 to 4-2

Products in Examples 1-1 to 4-2 were prepared by varying the mixing ratio of maltodextrin and crystalline cellulose. These mixing ratios are indicated in Table 2.

Examples 5 to 8

The raw materials were blended under the conditions in Example 3-2, and jujube extract powder was added in an amount of 0.5, 1, 2 or 3 wt. % of the total composition weight, thereby preparing the products in Examples 5 to 8.

Examples 9 to 12

After mixing the raw materials under the conditions in Example 6, drying and pulverizing the jujube, powdered jujube was added in an amount of 0.5, 1, 2 or 3 wt. % of the total composition weight, thereby preparing the products in Examples 9 to 12.

Experimental Example 1

Evaluation of tabletting Force, Hardness, Disintegration Degree, Abrasion and Fluidity of the Additive Composition According to the Present Invention In order to evaluate tabletting force, hardness, disintegration degree, abrasion and fluidity of the additive composition according to the present invention, experiments were conducted by the following procedures according to Examples 1-1 to 4-2.

Hardness was measured with reference to a time when the tablets after completion of tabletting were cracked and divided into half by a hardness tester (MHT-20, Campbell Elctronics, India), and then represented in unit of kg/cm^3.

A degree of disintegration was measured using a disintegrator (KDIT-200, KUKJE ENG CO., Korea) according to the standards of the Ministry of Food and Drug Safety. More particularly, after maintaining a temperature of water as a test solution at 37±2° C., an auxiliary plate was put in and moved up and down for 30 minutes. As a result of observing a state of the sample, when there was no residue of a sample or, even if exist, sponge type or soft substances were little contained, disintegration was considered to be appropriated. The finally selected control and experimental group were analyzed by the Korea Institute of Analysis and Technology.

Abrasion was measured as follows. 10 to 15 tablets after completion of tabletting were put in an abrasion measuring device, followed by applying rotational shock at a speed of 100 rpm for 1 minute. Then, a degree of abrasion was measured and classified into poor, normal and good according to the presence or absence of damage to the tablets, as shown in Table 1.

Fluidity (flowability) was measured and classified into poor, normal and good according to extent of filling a filler frame in the tablet machine with the raw material during tabletting, as shown in Table 1.

Tablettability was classified into poor, normal and good in consideration of binding force, lubricity and fluidity during tabletting, as shown in Table 1.

TABLE 1

| Standard for classification of tabletting state | | | | |
|---|---|---|---|---|
| ** | * | * | ++ | +++ |
| Bad | Poor | Normal | Good | Excellent |

The water content was measured as follows. After drying 2 g of raw material by means of an infrared water content meter (MB45, OHAUS, Parsippany, NJ, USA) at 105° C. for 2 hours or more, a moisture amount dried until the water content does not change by 1 mg or more for 60 seconds was indicated by the water content (%). The finally selected control and experimental group were analyzed by the Korea Institute of Analysis and Technology.

1-1. Comparison of Tabletting Force According to the Mixing Ratio of Raw Materials PI of Super Garcinia 1200 product purchased from Nature Pure Korea Co., Ltd. was selected as a positive control, and PI except for six (6) of existing synthetic additives (HPMC, CMC-Ca, silicon dioxide, titanium dioxide, magnesium stearate, propylene glycol) was selected as a negative control. Assessment for tablettability was performed with reference to these control groups. In order to examine changes in physical properties according to content ratios of the negative control and basic raw materials except for synthetic additives, comparison of tablettability relative to an amount of garcinia extract, maltodextrin and crystalline cellulose were also implemented. A selection ratio of added amount of raw materials is shown in Table 2 (Examples 1-1, 2-1, 3-1, and 4-1). The same weight ratio of maltodextrin and crystalline cellulose of 1:1 was applied to all of the experimental groups, except that the garcinia extract was proportionally increased (Examples 1-2, 2-2, 3-2, and 4-2). For the experimental groups, the experiment was conducted by increasing the weight ratio of maltodextrin and crystalline cellulose to 1:2.3 compared to the negative control.

TABLE 2

| | Added amount of raw material (unit: g) | | |
|---|---|---|---|
| Section | Garcinia extract | Maltodextrin | Crystalline cellulose |
| Example 1-1 | 150 | 30.94 | 30.94 |
| Example 1-2 | | 18.56 | 43.31 |
| Example 2-1 | 157.5 | 30.94 | 30.94 |
| Example 2-2 | | 18.56 | 43.31 |
| Example 3-1 | 165 | 30.94 | 30.94 |
| Example 3-2 | | 18.56 | 43.31 |
| Example 4-1 | 172.5 | 30.94 | 30.94 |
| Example 4-2 | | 18.56 | 43.31 |
| Control | 150 | 43.20 | 18.67 |

The results of this experiment are shown in Table 3. As a result of the experiment, experimental group 1 showed that hardness reached only 4 to 5 kg/cm^3 even when a pressure of the single-stroke tablet machine was increased to 14 or higher, therefore, it was determined that no binding force is obtained with the given composition ratio. In the case of Examples 1-2 and 2-2, disintegration did not occur within 30 minutes, which is the standard time, thereby not satisfying the criteria. In the case of Examples 3-2 and 4-2, it was confirmed that both disintegration and hardness were in appropriate levels.

ity was not improved. For Example 5 with addition of 0.5% jujube extract powder, hardness was 5 kg when the pressure of a single-stroke tablet machine was 6.5. Therefore, the hardness was increased in spite of reduction in pressure. However, it is determined that there is no increase in the overall abrasion, fluidity and tablettability.

In the case of Example 6 in which 1% of jujube extract powder was added, hardness was increased to 7.5 kg when the pressure of a single-stroke tablet machine was 6.5,

TABLE 3

Results of tabletting force according to the mixing ratio of raw materials

| | | | Tabletting test | | | | |
|---|---|---|---|---|---|---|---|
| | | | | Hardness (kg/cm^3) | | | |
| Section | Single-stroke pressure | Disintegration (min) | Average | Standard deviation | Abrasion | Fluidity | Tablett-ability |
| Example 1-1 | 14.2 | 8 | 5 | 0 | * | + | + |
| Example 1-2 | 9.2 | X | 9 | 0 | ++ | + | + |
| Example 2-1 | 14.2 | 15 | 3 | 0 | * | + | + |
| Example 2-2 | 8 | X | 10 | 0 | +++ | + | + |
| Example 3-1 | 14 | 12 | 4 | 0 | * | + | * |
| Example 3-2 | 11.2 | 15 | 7 | 0 | ++ | + | + |
| Example 4-1 | 13.4 | – | X | X | ** | ** | ** |
| Example 4-2 | 11.2 | 16 | 6 | 0 | + | + | + |
| Control | Rotary | 14 | 8 | 0 | ++ | + | + |

1-2. Comparison of Tabletting Force According to Addition of Jujube Extract Powder As a result of Experimental Example 1-1, the product in Example 4-2 had higher hardness than that of the product in Example 3-2 by 1 kg/cm^3 at the same pressure. However, considering that the added amount of garcinia raw material was 5% higher, the optimum content ratio of Example 3-2 was determined the most appropriate, and thus selected as a control for the present experiment. Based on constitutional composition of Example 3-2, the jujube extract powder was added in an amount of 0.5, 1, 2 or 3 wt. % of the total composition weight to prepare the products in Examples 5 to 8, respectively. Using these products as the experimental groups, experiments were implemented.

thereby confirming an increase in the binding force. Therefore, abrasion was improved. Further, in the case of Example 7 in which 2% of jujube extract powder was added, it could be seen that the pressure of a single-stroke tablet machine was 7.3, which is only about 0.2 of difference as compared to Example 6. Further, in the case of Example 8 in which 3% of jujube extract powder was added, hardness was 7.5, which is the same as Example 6. However, since fluidity and tablettability were generally still in low levels, the powder was adhered to the upper punch during tabletting, thus causing difficulties in tabletting. Therefore, it seems necessary to search for a lubricant material that can facilitate further improvement of fluidity and tablettability. In this

TABLE 4

Results of tabletting force according to addition of jujube extract powder

| | | LOD (%) | | Others | | LOD after dry (%) | |
|---|---|---|---|---|---|---|---|
| | | | | Added amount | Granulation | | |
| | Section | Average | Standard deviation | of 80% alcohol | time (h) | Average | Standard deviation |
| Control | Example 3-2 | 5.3 | 0.1 | 65 | 16 | 5.8 | 0.0 |
| Jujube extract powder | Example 5 | 6.4 | 0.1 | 65 | 16 | 6.7 | 0.1 |
| | Example 6 | 5.5 | 0.0 | 65 | 16 | 5.9 | 0.1 |
| | Example 7 | 6.3 | 0.1 | 65 | 16 | 6.9 | 0.1 |
| | Example 8 | 6.4 | 0.0 | 65 | 16 | 6.5 | 0.1 |

As a result of evaluating tablettability according to addition of the jujube extract powder, the control has hardness of only 3.9 kg/cm^3 even when the pressure of a single-stroke tablet machine is raised to 7, as well as good disintegration of not more than 30 minutes. However, abrasion was poor due to low hardness, and fluidity was not significantly different. Therefore, it is considered that overall tablettabilexperiment, it was confirmed that, when the jujube extract powder was added to the experimental groups by 1% or more, the binding force was increased, thereby causing an increase in the hardness. As a result of the present experiment, it was confirmed that the jujube extract powder is effective for increase of hardness, and is believed to be able to enhance the binding force.

TABLE 5

Results of tabletting force according to addition of jujube extract powder

| | | | | Tabletting test | | | | | |
|---|---|---|---|---|---|---|---|---|---|
| | | Singles-stroke pressure | Disintegration (min) | Hardness (kg/cm^3) | | Water content | Abrasion | Fluidity | Tablett-ability |
| Section | | | | Average | Standard deviation | | | | |
| Control | Example 3-2 | 7 | Within 30 minutes | 3.9 | 0.1 | 7.6 | * | + | * |
| Jujube extract powder | Example 5 | 6.8 | Within 30 minutes | 5.0 | 0.1 | 8.2 | + | + | + |
| | Example 6 | 6.5 | Within 30 minutes | 7.50 | 0.0 | 8.0 | ++ | + | + |
| | Example 7 | 6.5 | Within 30 minutes | 7.3 | 0.0 | 8.0 | ++ | + | + |
| | Example 8 | 6.5 | Within 30 minutes | 7.5 | 0.0 | 7.9 | ++ | + | + |

1-3. Comparison of Tabletting Force According to Addition of Jujube Powder

As a result of Experimental Example 1-2, for the experimental group with addition of 2% and 3% jujube powder, there was no significant difference from the experimental group with addition of 1% jujube extract powder. The raw materials were blended under the conditions of Example 6, and the experiment group was subjected to experiments using the products in Examples 9 to 12 with 0.5, 1, 2, and 3% of jujube powder (100% jujube), respectively, as the experimental groups.

As a result of the experiment, the control had the hardness of 6 kg/cm^3 when the pressure of a single-stroke tablet machine was 6.5, as well as good disintegration of less than 30 minutes. However, due to the lack of lubricity, when tabletting more than 4 to 5 tablets, an upper portion of the tablet is adhered to the upper punch and thus tabletting could not be conducted smoothly. In the case of Example 9 in which 1% of jujube extract powder and 0.5% of jujube powder were added, the hardness was 6 kg/cm^3, which is not different from that of the control. However, in the case of Example 9, a phenomenon, in which the tablet is adhered to the upper punch and thus entails difficulties in tabletting, was observed when tabletting 10 or more tablets. This is different from the control that demonstrated a difficulty in tabletting due to sticking of the tablet to the upper punch when tabletting existing 4 to 5 tablets. Further, in the case of Example 10 in which 1% of jujube powder was added, hardness and disintegration did not different from those of Example 9. However, since the tablet was adhered to the upper punch when tabletting 15 to 20 tablets, further tabletting was impossible.

TABLE 6

| | | | | Others | | | |
|---|---|---|---|---|---|---|---|
| | | LOD (%) | | Added amount of 80% alcohol (%) | Granulation (h) | LOD after dry (%) | |
| Section | | Average | Standard deviation | | | Average | Standard deviation |
| Control | Example 6 | 6.5 | 0.0 | 65 | 17 | 7.3 | 0.1 |
| Jujube powder (100% jujube) | Example 9 | 6.0 | 0.1 | 65 | 17 | 6.8 | 0.0 |
| | Example 10 | 5.9 | 0.1 | 65 | 17 | 6.3 | 0.1 |
| | Example 11 | 5.3 | 0.1 | 65 | 17 | 5.8 | 0.1 |
| | Example 12 | 5.5 | 0.1 | 65 | 17 | 5.9 | 0.1 |

However, as an addition rate of jujube is increased, it has been proved that a phenomenon of sticking to the upper punch is reduced to demonstrate effects of lubricity. Next, Example 11 in which 2% of jujube powder was added will be described. In the case of the previous experimental groups with lack of lubricity, frictional strength to a single-stroke tablet machine was strong and the pressure of the machine could not be increased, whereby hardness of the tablet is not increased. On the other hand, in the case of Example 11, lubricity was increased thus to proceed tabletting even when increasing the pressure of the single-stroke tablet machine up to 8. In addition, only one of 20 to 30 tablets was adhered to the upper punch during tabletting. Further, in the case of Example 12, even when tabletting was conducted 50 or more times, the phenomenon of sticking to the upper punch did not occur, and hardness reached 8 kg, which is 1 kg higher than Example 11 at the same pressure. As a result of the present experiment, it was confirmed that lubricity was increased according to the added amount of jujube powder, and when adding 3% of jujube powder as the highest content, tabletting was smoothly conducted and the binding force was also improved. Therefore, the product in the above example is expected to be useable as an excellent material.

The negative control had an irregular particle distribution, the average interface of 129.835 and the maximum interface of 11.25%, thereby it could be seen that overall physical properties were affected by the particle size of the tablets and a pore ratio between the particles. Therefore, the particle distribution could become uniform according to addition of jujube extract powder and jujube powder as substitutes for synthetic additive, which were selected under conditions for minimizing pores between the particles.

TABLE 7

Results of tabletting force according to addition of jujube powder

| | | | | Tabletting test | | | | | |
|---|---|---|---|---|---|---|---|---|---|
| | | Singles-stroke pressure | Disintegration (min) | Hardness ($kg/cm^3$) | | Water content | Abrasion | Fluidity | Tablett-ability |
| | Section | | | Average | Standard deviation | | | | |
| Control | Example 6 | 6.5 | Within 30 minutes | 6.0 | 0.0 | 8.0 | ++ | + | + |
| Jujube powder (Jujube 100%) | Example 9 | 6.5 | Within 30 minutes | 6.0 | 0.1 | 7.4 | ++ | + | + |
| | Example 10 | 6.5 | Within 30 minutes | 6.0 | 0.0 | 7.4 | ++ | + | + |
| | Example 11 | 8 | Within 30 minutes | 7.0 | 0.0 | 7.1 | ++ | ++ | ++ |
| | Example 12 | 8 | Within 30 minutes | 8.0 | 0.0 | 7.5 | +++ | ++ | ++ |

<Experiment 2> FE-SEM Analysis

FE-SEM analysis is performed as follows. With reference to a positive control including six (6) of synthetic additives (HPMC, CMC-Ca, silicon dioxide, titanium dioxide, magnesium stearate, propylene glycol) and a negative control without the above six (6) synthetic additives, changes in physical properties of jujube extract powder and jujube powder according to the added amount of the same were observed through FE-SEM under the conditions in Table 8 in terms of size and shape of the particles, and these observed results were analyzed by intergranular histogram that classifies particles at the interface. The tablets prepared in the examples were pulverized and powdered using a 40 mesh sieve, followed by observing the size and shape of the particles at 1,000 magnification using Thermal-SEM [VEGA3] of DML Co., Ltd.

Figure 2:
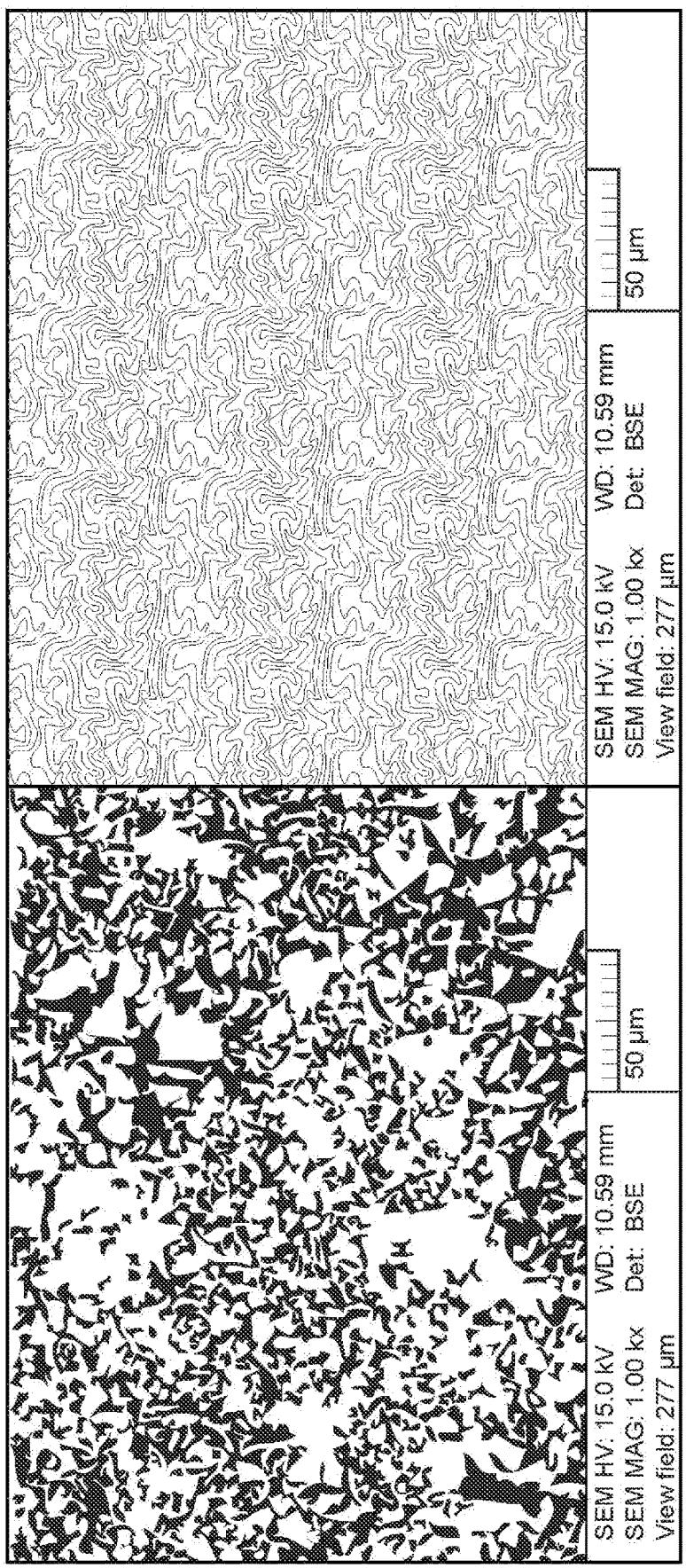
FIG. 2 illustrates FE-SEM results (negative control (left), interfacial interface activation (right)).
Figure 3:
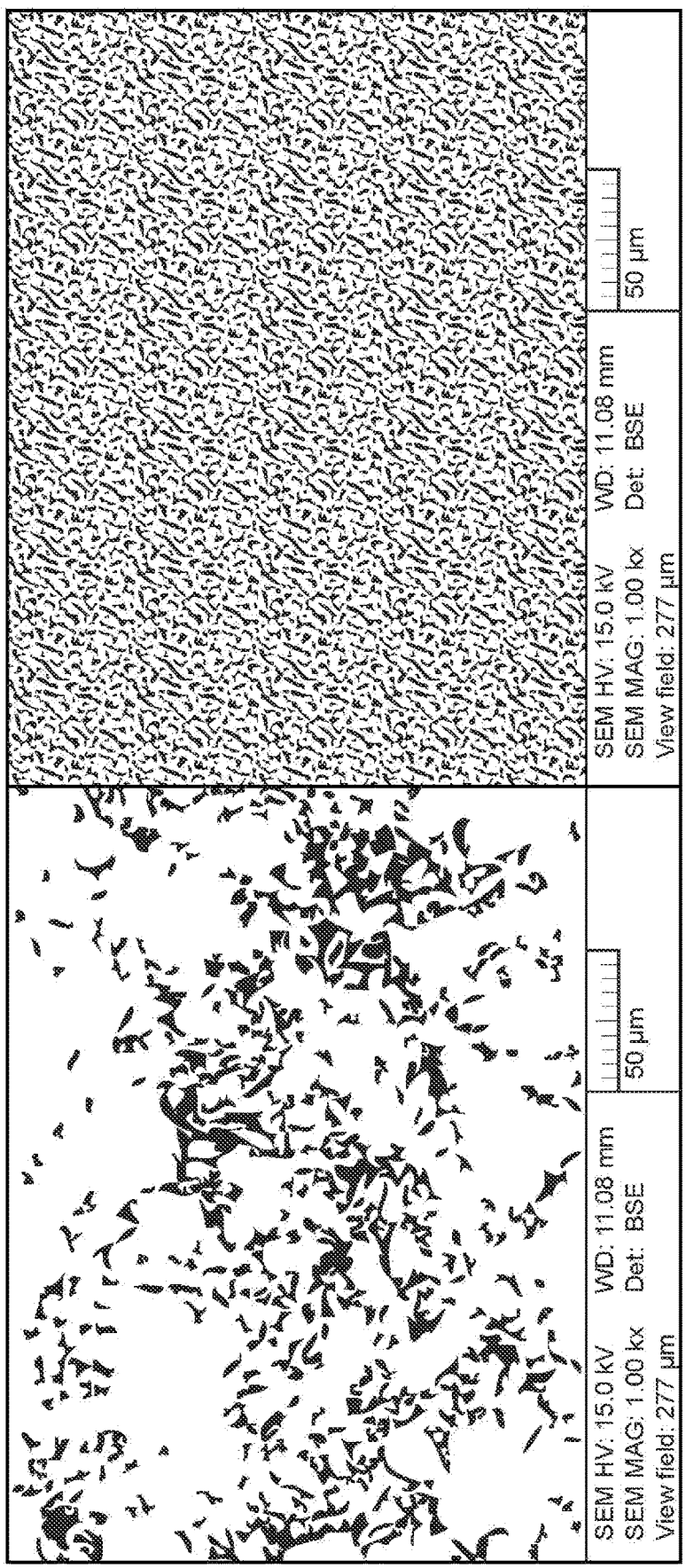
FIG. 3 illustrates FE-SEM results (Example 6 (left), interfacial interface activation (right)).
Figure 4:
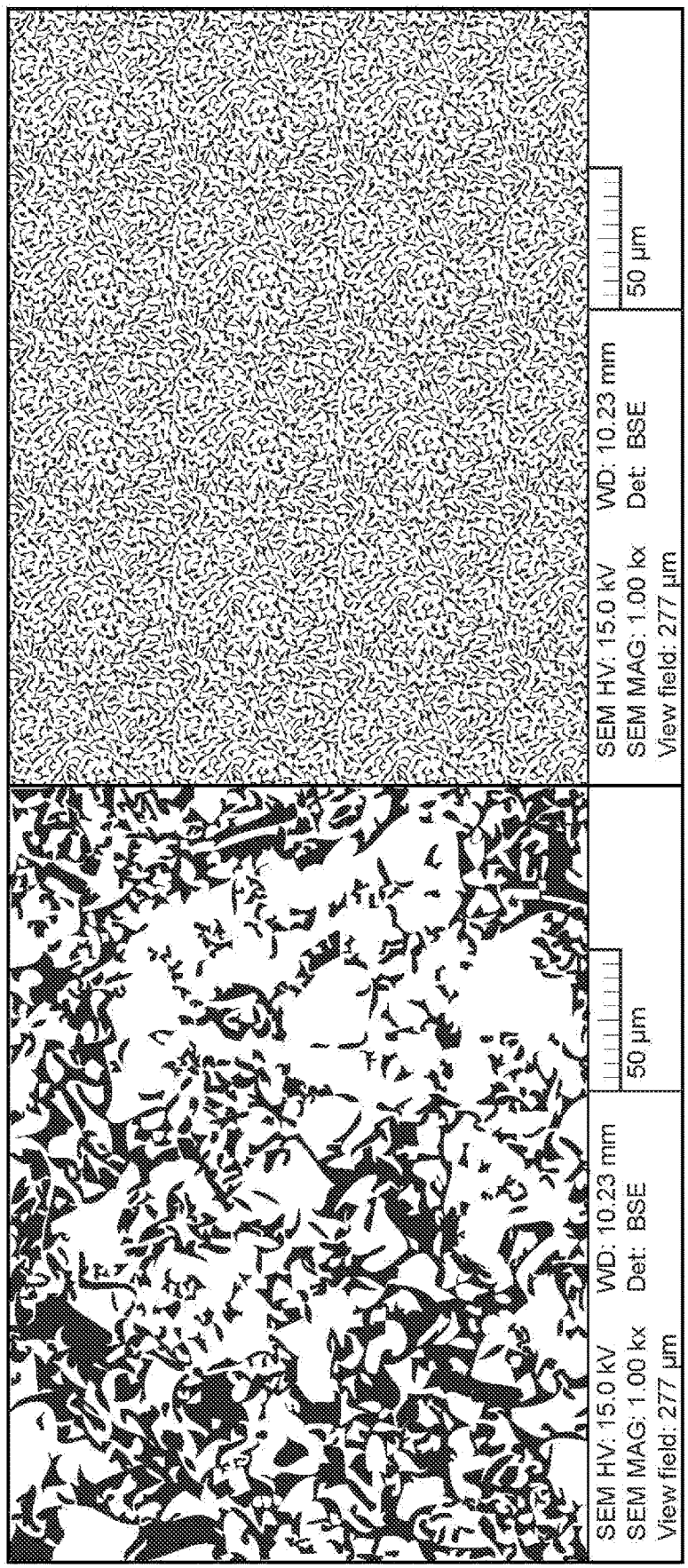
FIG. 4 illustrates FE-SEM results (Example 12 (left), interfacial interface activation (right)).
Figure 5:
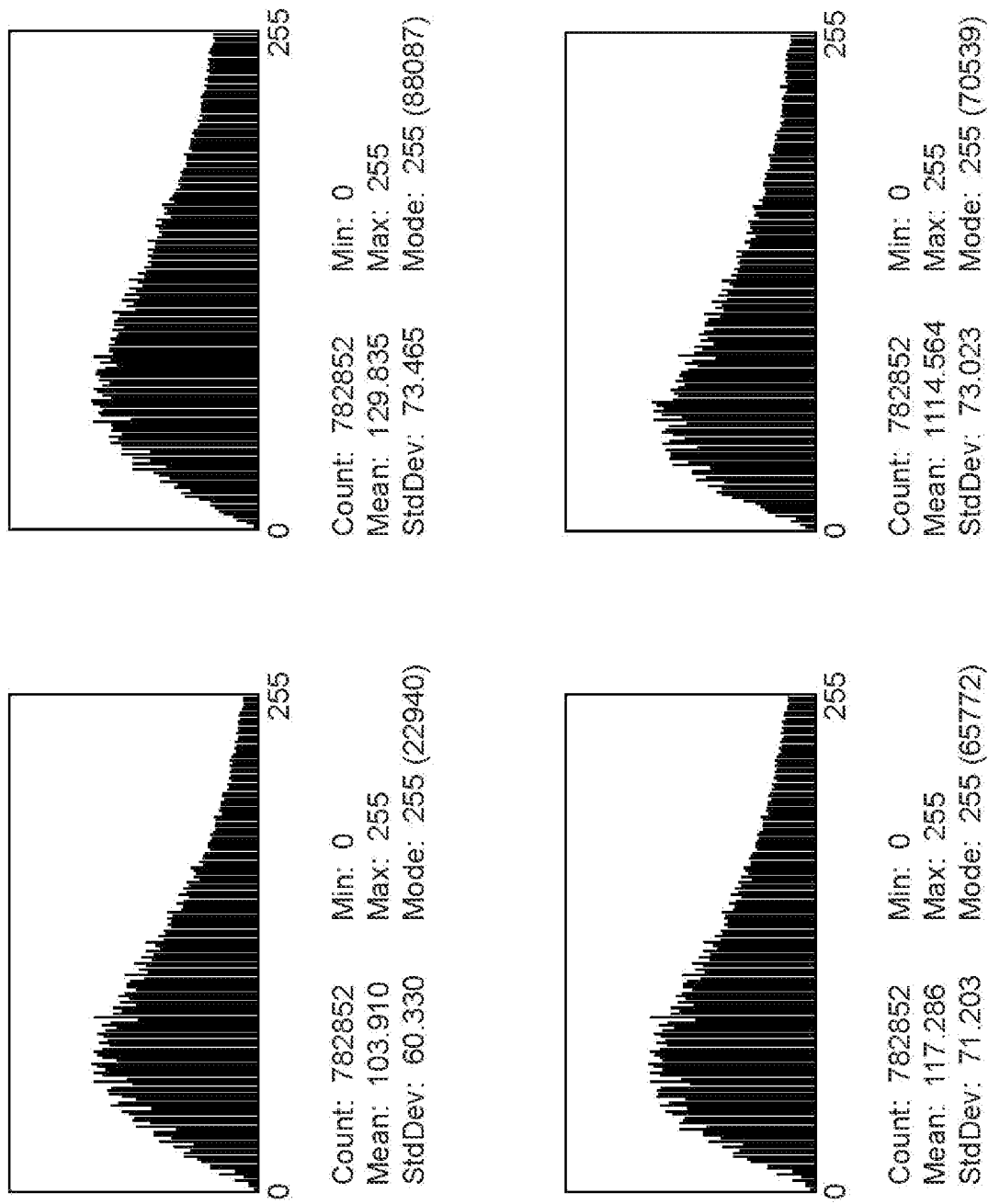
FIG. 5 illustrates results of intergranular interface analysis (histogram).

In the FE-SEM analysis, particle classification at the interface was performed by Image J program, and then converted to intergranular histogram for relative comparison, and results thereof are shown in FIGS. 1 to 5.

TABLE 8

FE-SEM analysis conditions

| Parameter | Condition |
|---|---|
| Machine | TESCAN (VEGA3) |
| Degradation ability | 3.0 nm at 30 kV (high vacuum) |
| | 3.5 nm at 30 kV (low vacuum) |
| Acc. Voltage | 200 V to 30 kV |
| Probe current | 1 pA to 2 uA |
| Electric gun | W heating cathode |

As a result of the experiment, it was found from 1,000 magnification data that the size and shape of particles are uniform in the positive control, wherein the average interface was 103.910 and the maximum interface was 2.93%.

When the jujube extract powder was added alone, it was found that the particle pore could be reduced by uniformly distributing fine particles starting from 0.5% area, but the above powder did not affect distribution and pores of large particles. Further, increasing the added amount of the powder did not increase the effect in proportional to the added amount from 1% or more. That is, although the jujube extract powder influences on improvement of the distribution of fine particles, the effects are insignificant in large particles. Therefore, 1% of jujube extract powder was selected as the optimum amount. Further, in the case of Example 6, it was found that the average interface was 117.286 and the maximum interface was 8.40%, thereby indicating that the average interface and the maximum interface could be reduced compared to the negative control. Therefore, in the case of the large particles, improvement was attempted using jujube powder, wherein 1% of jujube extract powder was mixed with 3% of jujube powder (in this case, the maximum amount of jujube powder was set to 3% due to the weight limit of the tablets), followed by adding the mixture. As a result, it was found that the distribution of fine particles and large particles could become uniform and the pores could be mostly reduced. Further, in the case of Example 12, the average interface was 114.564 and the maximum interface was 9.01%. That is, the average interface was reduced by 2.722%, but the maximum interface was increased by 0.61%, as compared to Example 6. Therefore, it could be seen that an amount of fine particles distributed within the pores of large particles are increased due to an increase in the pores of the large particles. Further, it was determined that a mixture of 1% jujube extract powder and 3% jujube powder could replace the effects of six (6) synthetic additives since the particle size was proved to be adjustable closely to that of the positive control.

TABLE 9

FE-SEM result analysis

| Section | Average interface | Standard deviation | Maximum interface (%) |
|---|---|---|---|
| Positive control | 103.910 | 60.330 | 2.93 |
| Negative control | 129.835 | 73.465 | 11.25 |
| Example 6 | 117.286 | 71.203 | 8.45 |
| Example 12 | 114.564 | 73.023 | 9.01 |

<Experiment 3> X-Ray Diffraction Analysis (XRD) Method and Procedure

Figure 6:
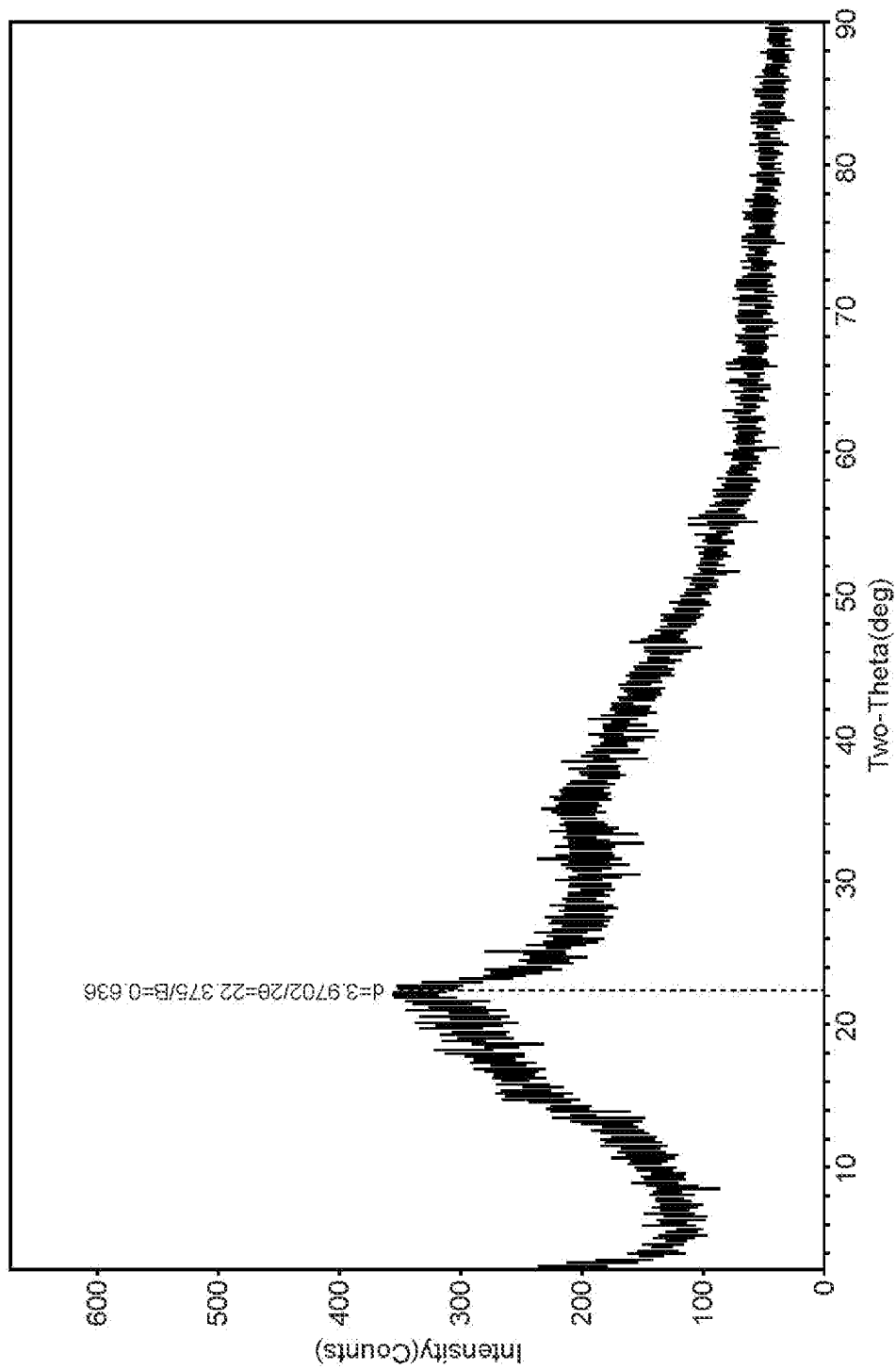
FIG. 6 illustrates XRD results (positive control).
Figure 7:
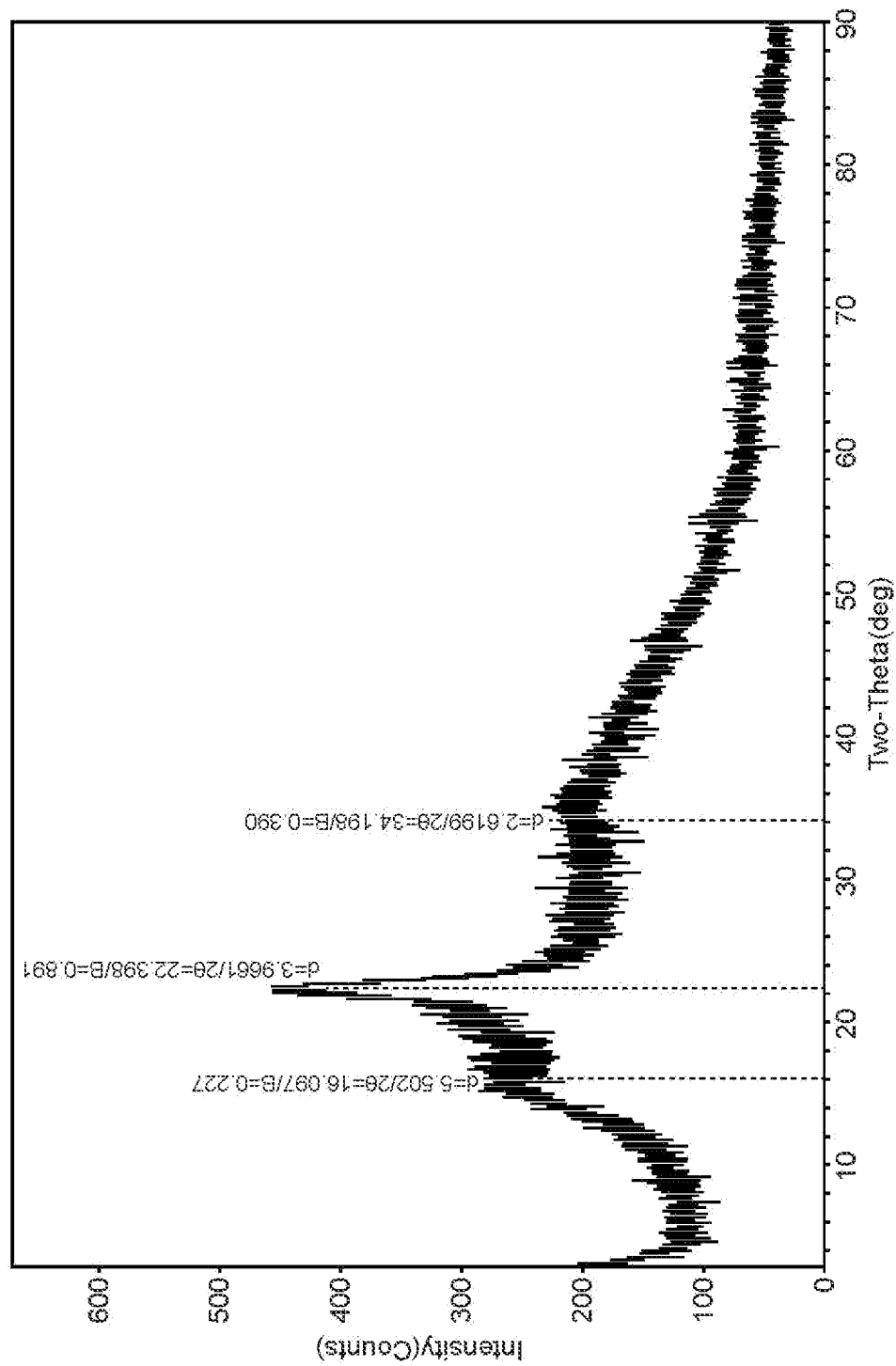
FIG. 7 illustrates XRD results (negative control).
Figure 8:
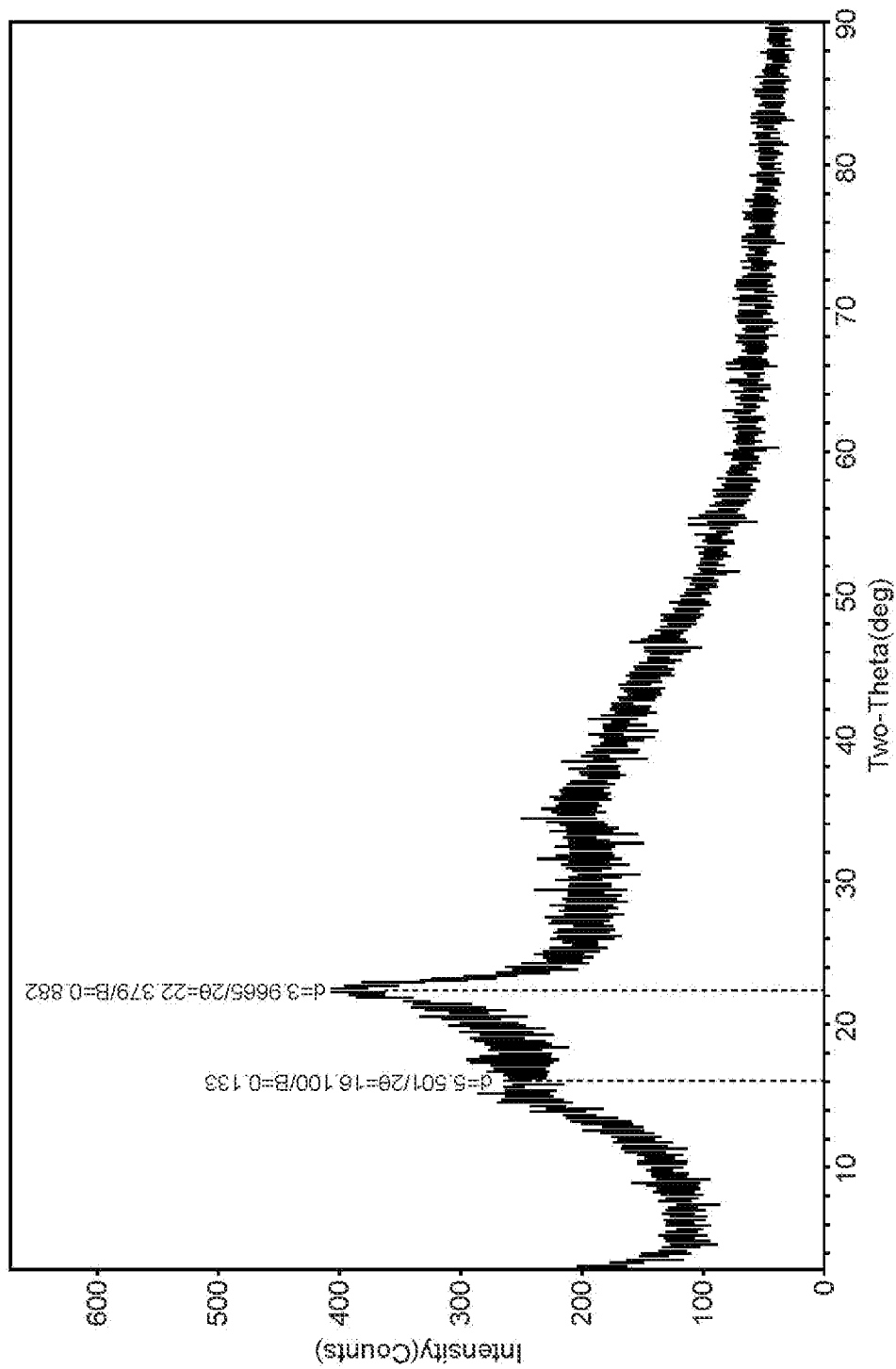
FIG. 8 illustrates XRD results (Example 6).
Figure 9:
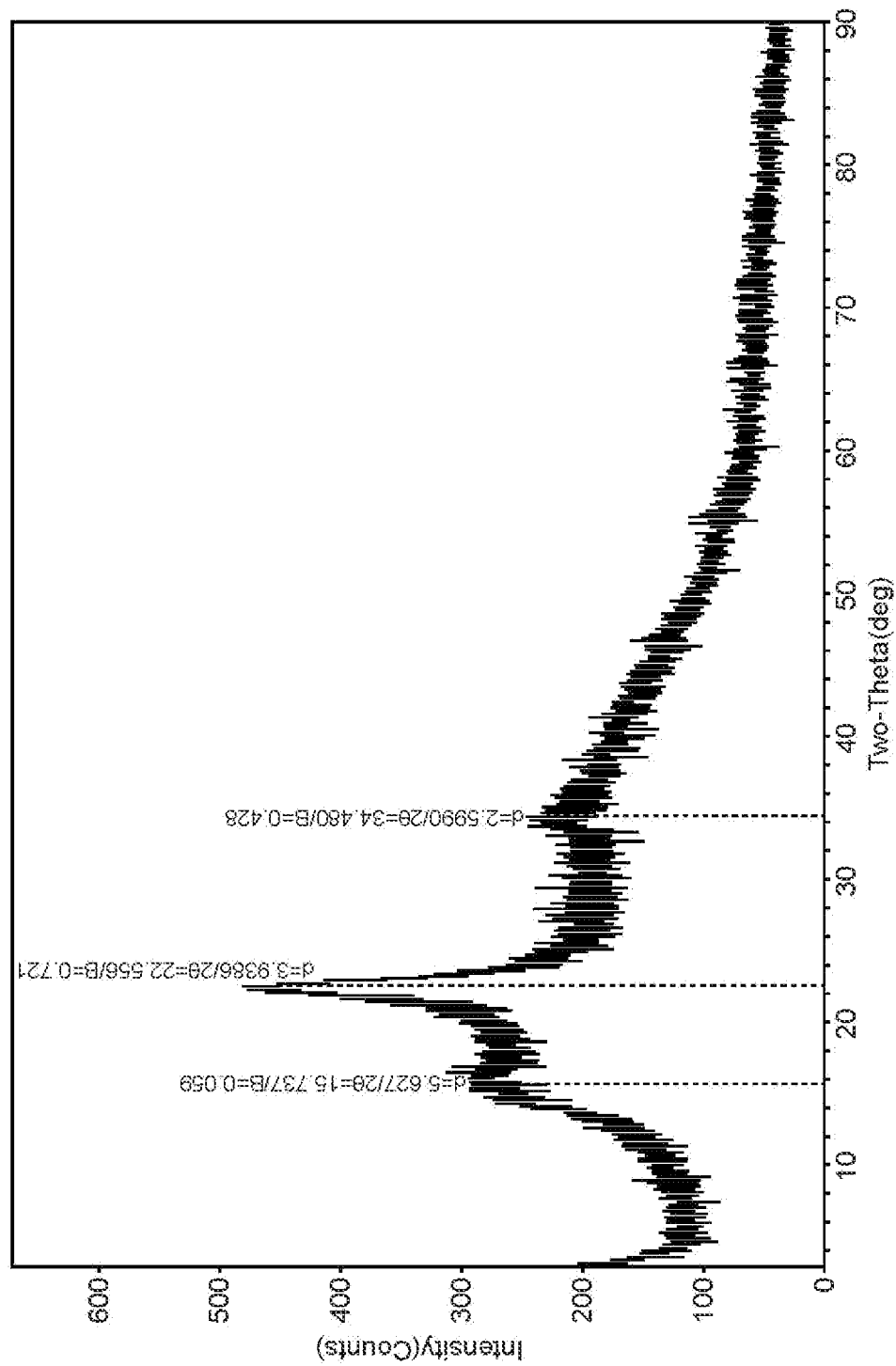
FIG. 9 illustrates XRD results (Example 12).
Figure 10:
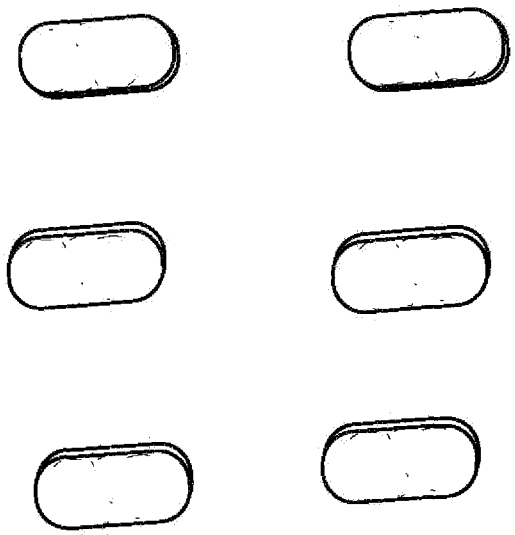
FIG. 10 illustrates tablets manufactured according to the present invention.

With reference to the positive control including six (6) synthetic additives (HPMC, CMC-Ca, silicon dioxide, titanium dioxide, magnesium stearate, and propylene glycol) and the negative control without the above six (6) synthetic additives, changes in physical properties of the product according to the added amount of jujube extract powder and jujube powder were analyzed by an X-ray diffraction analysis method in the Korea Institute of Science and Technology's Characteristic Analysis Center. The tablets prepared in the above examples were pulverized and powdered using a 40 mesh sieve, followed by analysis of crystalline phases using XRD (high resolution-HR-1) under the conditions in Table 10 and, then confirming the powder. The analyzed results of crystal shape, lattice spacing and particle size through XRD are shown in FIGS. 6 to 9.

TABLE 10

XRD analysis conditions

| Parameter | Condition |
|---|---|
| Machine | XRD (high solution-HR-1, ATX-G) |
| Powder | Max power: 18 kW (60 kV, 300 mA) |
| | Using power: 12 kW (40 kV, 300 mA) |
| X-ray target | Cu |
| Goniometer radius | 300 nm |
| Optics | Parabolic multi-layer crystal, 2-channel cut Ge (220) |
| | 4-channel cut Ge (220), Analyzer |
| Two scan range | −3 to 158° C. |

As a result of the experiment, in the case of crystalline forms, all of the forms were amorphous as irregular patterns. The largest one was classified as the main crystal and others were sequentially represented as the sub-crystal. In the case of the positive control, the crystals were uniform in polycrystalline form (1), while the negative control showed irregular crystals in polycrystalline (3). Further, 1% jujube extract powder was polycrystalline (2) while 1% jujube extract powder+3% jujube powder were polycrystalline (3), demonstrating that the synthetic additive substitutes did not significantly influence on the number of crystals. In the case of a lattice spacing regarding 1% jujube extract powder+3% jujube powder, it could be seen that the main crystals decreased the lattice spacing according to an increase in the number of crystals as compared to the control groups, thereby reducing particle pores formed by the main crystals, whereas sub-crystals 1 reduced the particle pores while sub-crystals 2 increased the same. Therefore, it could be seen that the particle pores were reduced by relatively adjusting the lattice spacing. With regard to the particle size, it was found that the main crystals of the negative control had increased particle size thus to increase the particle pore, as compared to the positive control. On the other hand, the particle pore of 1% jujube extract powder was slightly decreased while that of 1% jujube extract powder+3% jujube powder was considerably reduced. On the other hand, the sub-crystals 1 and 2 showed an increase in the particle pore. Eventually, it was confirmed that overall particle pores were reduced.

In other words, with regard to imbalance of particle distribution caused by an increase in crystals when no synthetic additive is added, it could be seen that mixing the jujube extract powder and jujube powder and adding the mixture to a formulation may adjust a lattice spacing between main crystals and sub-crystals as well as a particle size thus to reduce particle pores, and thereby uniformly improving overall particle distribution.

TABLE 11

| Section | Crystal form (polycrystalline) | Lattice spacing (d) | Particle size (B) | Note |
|---|---|---|---|---|
| Positive control | Amorphous (1) | 3.970 | 0.636 | Main crystal |
| Negative control | Amorphous (3) | 3.966 | 0.891 | Main crystal |
| | | 5.502 | 0.227 | Sub-crystal 1 |
| | | 2.619 | 0.390 | Sub-crystal 2 |
| Example 6 | Amorphous (2) | 3.969 | 0.882 | Main crystal |
| | | 5.501 | 0.133 | Sub-crystal 1 |
| Example 12 | Amorphous (3) | 3.938 | 0.721 | Main crystal |
| | | 5.627 | 0.259 | Sub-crystal 1 |
| | | 2.599 | 0.428 | Sub-crystal 2 |

INDUSTRIAL APPLICABILITY

The present invention relates to an additive composition for a formulation, which can be used as an excipient in order to manufacture tablets and powder products in the field of health food industry. Therefore, the present invention has high industrial applicability.

The invention claimed is:

1. An additive composition for formulation, comprising:
   1 to 3% by weight of jujube extract powder based on a total weight of a tablet or a powder formulation; and
   2 to 3% by weight of jujube powder based on the total weight of a tablet or a powder formulation,
   wherein the jujube extract powder is a binder while the jujube powder is a lubricant,
   wherein the additive composition further includes an excipient,
   wherein the excipient is maltodextrin and crystalline cellulose,
   wherein the maltodextrin and crystalline cellulose are included in a weight ratio of 1:1 to 2.5.
2. The composition according to claim 1, wherein the jujube extract powder and jujube powder are included in a weight ratio of 1:1 to 3.
3. The composition according to claim 1, wherein the composition reduces particle pores in the tablets.

* * * * *